United States Patent
Kozono et al.

(10) Patent No.: US 8,767,125 B2
(45) Date of Patent: Jul. 1, 2014

(54) VIDEO DISPLAY DEVICE, VIDEO OUTPUT DEVICE, VIDEO SYSTEM, AND MENU-SCREEN-DISPLAY CONTROL METHOD

(75) Inventors: Yosuke Kozono, Tokyo (JP); Masahiko Nakahama, Kanagawa (JP)

(73) Assignee: Sony Corporation, Tokyo (JP)

(*) Notice: Subject to any disclaimer, the term of this patent is extended or adjusted under 35 U.S.C. 154(b) by 706 days.

(21) Appl. No.: 12/709,288

(22) Filed: Feb. 19, 2010

(65) Prior Publication Data

US 2010/0225814 A1   Sep. 9, 2010

(30) Foreign Application Priority Data

Mar. 3, 2009   (JP) ............................. P2009-049758

(51) Int. Cl.
*H04N 5/50* (2006.01)
*H04N 5/445* (2011.01)
*H04N 5/44* (2011.01)

(52) U.S. Cl.
USPC ........... 348/569; 348/563; 348/725; 348/553; 725/59

(58) Field of Classification Search
USPC ......................................... 348/553, 563, 564
See application file for complete search history.

(56) References Cited

U.S. PATENT DOCUMENTS

| | | | |
|---|---|---|---|
| 2006/0020998 A1* | 1/2006 | Bronstein et al. | 725/151 |
| 2007/0245244 A1* | 10/2007 | Chien et al. | 715/730 |
| 2009/0284536 A1 | 11/2009 | Yoshida | |

FOREIGN PATENT DOCUMENTS

| | | |
|---|---|---|
| JP | 2008-054300 | 3/2008 |
| JP | 2008-078961 | 4/2008 |
| JP | 2008-092208 | 4/2008 |

OTHER PUBLICATIONS

HDMI specifiaction 1.3a, Nov. 10, 2006.*

* cited by examiner

*Primary Examiner* — Jefferey Harold
*Assistant Examiner* — Michael Teitelbaum
(74) *Attorney, Agent, or Firm* — Finnegan, Henderson, Farabow, Garrett & Dunner, L.L.P.

(57) ABSTRACT

A video display device, a video output device, and a video system are provided, each of which has a user-interface having high usability in menu operation so that false operation may be prevented, and a menu-screen-display control method is provided. The menu-screen-display control method includes: determination process of determining which device, of a video display device and one or more video output devices connected to the video display device, is an object of operation through a menu screen displayed on the video display device; and prohibition process of setting a non-object device into a menu-operation-prohibited mode, the non-object device being a device other than an operation object device which is determined to be the object of operation through the menu screen under display.

10 Claims, 19 Drawing Sheets

| LOGICAL ADDRESS | CATEGORY OF DEVICE |
|---|---|
| 0 | TV |
| 1 | RECORDING DEVICE I |
| 2 | RECORDING DEVICE II |
| 3 | TUNER I |
| 4 | REPRODUCING DEVICE I |
| 5 | AUDIO SYSTEM |
| 6 | TUNER II |
| 7 | TUNER III |
| 8 | REPRODUCING DEVICE II |
| 9 | RECORDING DEVICE III |
| ⋮ | ⋮ |

| PHYSICAL ADDRESS | LOGICAL ADDRESS |
|---|---|
| 0 | — |
| 1 | 4 |
| 2 | 1 |
| 3 | — |

VIDEO DISPLAY DEVICE, VIDEO OUTPUT DEVICE, VIDEO SYSTEM, AND MENU-SCREEN-DISPLAY CONTROL METHOD

BACKGROUND OF THE INVENTION

1. Field of the Invention

The present invention relates to a video display device such as television receiver having menu screen display function, a video output device such as recorder connected to the video display device, and a video system including the video display device and the video output device, and relates to a menu-screen-display control method applied to the video system.

2. Description of Related Art

Recently, a link function has been completed with spread of a flat television receiver, the link function facilitating and smoothing cooperation of such a television receiver (video display device) with an external device (video output device) such as a recorder. In particular, a new-generation DVD (Digital Versatile Disc) recorder has been widely used in recent years, so that it progressively becomes natural that high-definition broadcast data are recorded while keeping high image quality of the data. The link function is necessary for greatly facilitating handling of such recording and the like.

While names of the link function are different depending on manufacturers, a basic standard of the link function is HDMI-CEC (High Definition Multimedia Interface-Consumer Electronics Control). In the HDMI-CEC standard, a control signal according to the CEC protocol is transmitted via an HDMI cable, so that cooperation between devices is achieved. Thus, a user is freed from troublesome passing of a remote controller from one hand to the other hand, or from complicated button operation, so that the user may enjoy a video image or a sound with simple operation.

The HDMI-CEC standard includes a basic inter-device control function using a common command unified among manufacturers, and a unique inter-device control function using a specific command that may be freely developed by each manufacturer, and several proposals have been made on this type of technique.

For example, Japanese Unexamined Patent Application Publication No. 2008-92208 discloses a technique on menu display of each of a video output device and a video display device. In the technique, when a menu of the video output device is pressed, input selection in the video display device is switched to the video output device, so that a menu screen of the video output device is displayed.

Japanese Unexamined Patent Application Publication No. 2008-78961 discloses a technique where information of a recorded program is transferred from a recording device to a video display device, thereby even if input selection in the video display device is not switched to the recording device, the recorded program may be recognized.

Japanese Unexamined Patent Application Publication No. 2008-54300 discloses a technique considering an external device being not compliant to CEC. Generally, which device is active between devices may be grasped by using CEC. However, when a device being not compliant to CEC exists, since the device may not notify another device of a fact that the device itself is active, a different device, which has previously made such active-device notification, is falsely recognized as an active device in communication. To solve this, in the technique of Japanese Unexamined Patent Application Publication No. 2008-54300, when input selection is switched in the video display device, a fact that the device being not compliant to CEC is active is notified from the video display device to another device.

SUMMARY OF THE INVENTION

A video display device of a television receiver or the like typically has a plurality of input terminals that may be connected with several video output devices, and a user selects and uses one of the input terminals. When each device (the video display device or each video output device) is operated, it is usual that a menu screen is displayed for each device on the video display device, and a corresponding device is operated on each menu screen. In this case, a method (A) where a menu screen of the video display device itself and a menu screen of each video output device are concurrently displayed on the video display device, and a method (B) where only one of menu screens of the video display device and the video output devices is displayed on the video display device are considered.

However, in the method (A), it may be considered that the menu screen of the video output device is covered by the menu screen of the video display device and thus not seen, and conversely. The menu screens of the devices may be made not to overlap with each other in order to avoid this. However, when both the menu screens look alike, it is hard to know which device is associated with a currently-displayed menu screen (which device is currently subjected to setting change operation), so that a user is confused. Even in the method (B), when the menu screen of the video output device and the menu screen of the video display device look alike, it is hard to know which device is associated with a currently-displayed menu screen, so that a user may be mistaken and confused. As a result, a user may falsely perform menu operation of a video output device of which the menu screen is not displayed on the video display device, so that the user may perform unintentional operation (false setting). Such confusion of a user may occur even in the case that a plurality of video output devices are connected to a video display device. Specifically, when a menu screen of a first video output device is displayed on a video display device, a user may falsely recognize the menu screen as a menu screen of a second video output device by mistake, and disadvantageously perform menu operation of the second video output device.

In this regard, the systems described in the Japanese Unexamined Patent Application Publication Nos. 2008-92208, 2008-78961 and 2008-54300 do not consider competition or adjustment in menu screen between devices, and therefore the systems have not necessarily been highly useful for a user.

It is desirable to provide a video display device, a video output device, and a video system, each of which has a user-interface having high usability in menu operation so that false operation may be prevented, and provide a menu-screen-display control method applied to them.

A menu-screen-display control method according to an embodiment of the invention includes determination process of determining which device, of a video display device and one or more video output devices connected to the video display device, is an object of operation through a menu screen displayed on the video display device, and prohibition process of setting a non-object device into a menu-operation-prohibited mode, the non-object device being a device other than an operation object device which is determined to be the object of operation through the menu screen under display.

A video display device according to an embodiment of the invention includes a display section, a determination section determining which device, of a video display device and one or more video output devices connected to the video display device, is an object of operation through a menu screen displayed on the video display device, and a command issue section issuing a menu-operation-prohibited command for setting a non-object device into a menu-operation-prohibited mode, the non-object device being a device other than an operation object device which is determined to be the object of the operation through menu screen under display.

A video output device according to an embodiment of the invention includes a communication section for communicating with the video display device, and a control section setting the video output device itself to a menu-operation-prohibited mode when the video output device receives a menu-operation-prohibited command from the video display device via the communication section.

A video system according to an embodiment of the invention includes the video display device configured as above, and the video output device connected to the video display device.

In the video display device according to the embodiment of the invention, which device is an object of a menu screen displayed on the display section is determined, and a menu-operation-prohibited command for setting a non-object device other than the determined operation object device to a menu-operation-prohibited mode is sent to the non-object device. In contrast, the video output device according to the embodiment of the invention is set to a menu-operation-prohibited mode when the video output device receives a menu-operation-prohibited command from the video display device. As a result, menu-operation-exclusive control is performed, where only one device is limitedly set between the video display device and video output devices connected to the video display device such that a menu screen of the relevant device may be displayed on the video display device so that menu operation of the device may be performed.

In the video display system and the menu-screen-display control method according to the embodiment of the invention, which device is an object of a menu screen under display on the video display device is determined, and a non-object device other than the determined operation object device is set to the menu-operation-prohibited mode. As a result, the above menu-operation-exclusive control is performed.

Specifically, for example, the video display device operates such that while a menu screen of the video display device itself is displayed by user operation, the device notifies a video output device of such a display condition by using a menu-operation-prohibited command. The notified video output device recognizes the fact that the video display device displays the menu screen, and thus even if a user presses a menu operation key of the video output device itself, the video output device prohibits display and operation of a menu screen of the device itself. Thus, when a menu of the video display device is displayed, the video output device may not be subjected to display of the menu screen and menu operation.

Moreover, for example, while the menu screen of the video output device is displayed, even if a user presses a menu operation key of the video display device, the video display device prohibits display and operation of the menu screen of the device itself. Thus, when a menu of the video output device is displayed, the video display device is prevented from performing display of the menu screen of the device and menu operation thereof.

When the menu screen of the video display device is released by user operation, it is enough that the video display device notifies the video output device of such release of the menu screen. Thus, menu display of the video output device may be performed on the video display device. The same is true in the case that the video display device displays a menu screen of a video output device, and the menu screen is then released. When the video display device is connected with at least two video output devices (for example, first and second video output devices), a video output device being not selected as an input device is preferably set to a menu-operation-prohibited mode. In this case, for example, when input selection is switched from the first video output device to the second video output device, the second video output device is preferably cooperatively shifted into a menu-operation-permitted mode.

According to the video system or the menu-screen-display control method according to the embodiment of the invention, which device is an object of a menu screen under display on the video display device is determined, and a non-object device other than an operation object device determined to be the object of the menu screen under display is set to a menu-operation-prohibited mode, thereby the menu-operation-exclusive control is performed, where only one device is limitedly set such that a menu screen thereof may be displayed on the video display device so that menu operation of the device may be performed. Therefore, false menu operation based on a mistake or confusion of a user may be prevented, leading to improvement in usability.

Other and further objects, features and advantages of the invention will appear more fully from the following description.

DETAILED DESCRIPTION OF THE PREFERRED EMBODIMENTS

Hereinafter, preferred embodiment of the invention (hereinafter, simply called embodiments) will be described in detail with reference to drawings.

Figure 1:
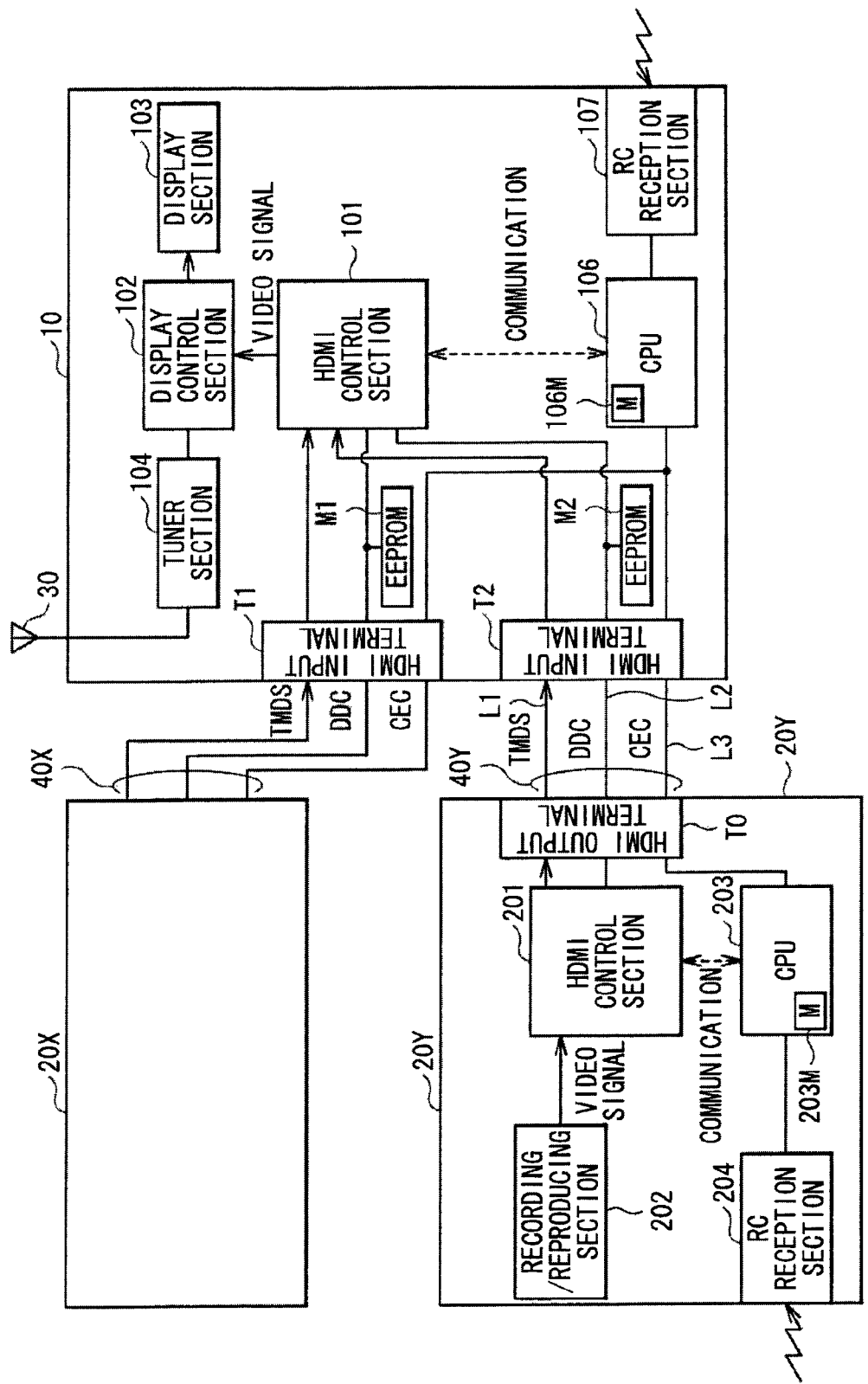
FIG. 1 is a block diagram showing a schematic configuration of a video system according to an embodiment of the invention.

FIG. 1 shows a configuration example of a video system according to an embodiment of the invention. Since a video display device, a video output device, and a menu-screen-display control method according to embodiment of the invention are embodied by using the video system, they will be described together below.

System Configuration

The video system includes a video display device 10, and two video output devices 20X and 20Y. The video display device 10 is, for example, configured as a television receiver. The video output devices 20X and 20Y include, for example, a recorder incorporating a recording drive such as hard disc, DVD or BD (Blu-ray Disc), a video camera, or an external tuner.

The video display device 10 has HDMI input terminals T1 and T2, an HDMI control section 101, a display control section 102, a display section 103, and a tuner section 104.

The HDMI input terminals T1 and T2 are configured using a connector according to the HDMI-CEC standard each, and connected with the video output devices 20X and 20Y as external devices, respectively. The HDMI control section 101 performs transmission/reception operation according to the HDMI-CEC standard to/from the video output devices 20X and 20Y via the HDMI input terminals T1 and T2, respectively, under the control by a CPU 106 which will be described later. Specifically, for example, the HDMI control section 101 performs control of selecting one of the HDMI input terminals T1 and T2 (video output devices 20X and 20Y) according to user operation, and transmitting a video signal inputted from an input terminal of the selected input terminal to the display control section 102. A connection relationship between the HDMI input terminals T1 and T2 and the HDMI control section 101 will be described in detail later.

The display control section 102 performs various types of image processing or control for displaying a video on the display section 103 according to the video signal received from the HDMI control section 101 or the tuner section 104. The display section 103 is configured using a display device such as a liquid crystal display device or an organic EL (Electro Luminescence) device, and displays a video or a menu screen on a display surface thereof. The menu screen includes a menu screen for controlling operation of the video display device 10 itself (display device menu screen), and besides a menu screen for controlling operation of an external device (the video output devices 20X and 20Y) (external device menu screen).

The tuner section 104 performs predetermined reception process or decoding process to a broadcast wave received by an antenna 30, thereby restores a video signal, an audio signal and the like, and supplies the video signal to the display control section 102. In FIG. 1, portions associated with the audio signal are omitted to be shown for simplifying description, and description of the portions is also omitted.

The video display device 10 further has the CPU 106 and an RC reception section 107. The CPU 106 functions as a main controller of the video display device 10, and controls the HDMI input terminals T1 and T2, the HDMI control section 101, and the RC reception section 107. The CPU 106 has a memory 106M, and stores various control data described later in the memory. The RC (Remote Control) reception section 107 receives a control signal from a not-shown remote control device, and transmits the signal to the CPU 106. Here, the CPU 106 corresponds to a specific example of the "determination section" or the "command issue section" of the invention.

Each of the HDMI input terminals T1 and T2 has a TMDS (Transition Minimized Differential Signaling) terminal, a DDC (Display Data Channel) terminal, and a CEC (Consumer Electronics Control) terminal. The TMDS terminal and the DDC terminal of each of the HDMI input terminals T1 and T2 are connected to the HDMI control section 101, and the CEC terminal thereof is connected to the CPU 106. The DDC terminals of the HDMI input terminals T1 and T2 are connected with nonvolatile memories M1 and M2 including EEPROM or the like, respectively. The nonvolatile memories M1 and M2 store physical addresses of the HDMI input terminals T1 and T2, respectively. Here, the physical addresses of the HDMI input terminals T1 and T2 are assumed to be set to 1 and 2, respectively.

TMDS is one of transmission methods used for transmitting a digital video signal between a display and a video card, and used in such a manner that four channels are combined into a unit called "link". One channel is allocated to each of video signals R, G and B, and one channel is allocated to a signal for synchronization of clock frequency, and therefore four channels exist in total.

DDC is originally a standard for exchanging various types of information (allowable resolution and color depth of a display, and scanning frequency and model specification thereof) between a display and a PC so that PnP (plug and play) is achieved. The information are used to inherit setting information of the display, so that setting may be automatically performed in accordance with performance of each display.

CEC is a device control signal and a control protocol standardized by HDMI, where a CEC command is transmitted via an HDMI cable so that cooperation between devices is achieved. The CEC command will be described later.

The video output device 20Y has an HDMI output terminal T0, an HDMI control section 201, a recording/reproducing section 202, a CPU 203, and an RC reception section 204. The HDMI output terminal T0 is connected to the HDMI input terminal T2 of the video display device 10 by an HDMI cable 40Y. The HDMI cable 40Y includes a TMDS line L1, a DDC line L2, and a CEC line L3, the lines connecting between a TMDS terminal of the HDMI output terminal T0 and the TMDS terminal of the HDMI input terminal T2, between a DDC terminal of the HDMI output terminal T0 and the DDC terminal of the HDMI input terminal T2, and between a CEC terminal of the HDMI output terminal T0 and the CEC terminal of the terminal T2, respectively.

The TMDS line L1 is used by each externally connected device (the video output devices 20X and 20Y) for transmitting a video signal, an audio signal, and various data to the video display device 10. The various data include SPDIF (Source Product Descriptor Info Frame). The DDC line L2 is used when the video output devices 20X and 20Y acquire a physical address of the device itself from the video display device 10 as will be described later. The CEC line L3 is used for transmitting/receiving a CEC command which will be described later between the video display device 10 and the video output devices 20X and 20Y.

The HDMI control section 201 performs transmission/reception operation according to the HDMI-CEC standard to/from the video display device 10 via the HDMI output terminal T0 under control of the CPU 203. Specifically, for example, the HDMI control section 201 performs control of transmitting a reproduced video signal from the recording/reproducing section 202 to the video display device 10 via the HDMI output terminal T0 according to user operation. Here, the HDMI control section 201 corresponds to a specific example of a communication section of the invention.

The recording/reproducing section 202 includes a recording drive such as a hard disc, DVD, or BD. The CPU 203 acts as a main controller of the video output device 20Y, and is connected to the HDMI output terminal T0, the HDMI control section 201, and the RC reception section 204. The CPU 203 has a memory 203M storing various control data therein. The control data include, for example, data showing a physical address of the HDMI input terminal T1 or T2 of the video display device 10 connected to the video output device 20Y, data showing a logical address assigned to the video output device 20Y. The RC reception section 204 receives a control signal from a not-shown remote control device, and transmits the signal to the CPU 203. Here, the CPU 203 corresponds to one specific example of the "control section" of the invention.

The video output device 20X has a configuration similar to that of the video output device 20Y (components of the device are omitted to be shown in FIG. 1). An HDMI output terminal (not shown) of the video output device 20X is connected to the HDMI input terminal T1 of the video display device 10 by an HDMI cable 40X.

Figures 2, 3, 4:
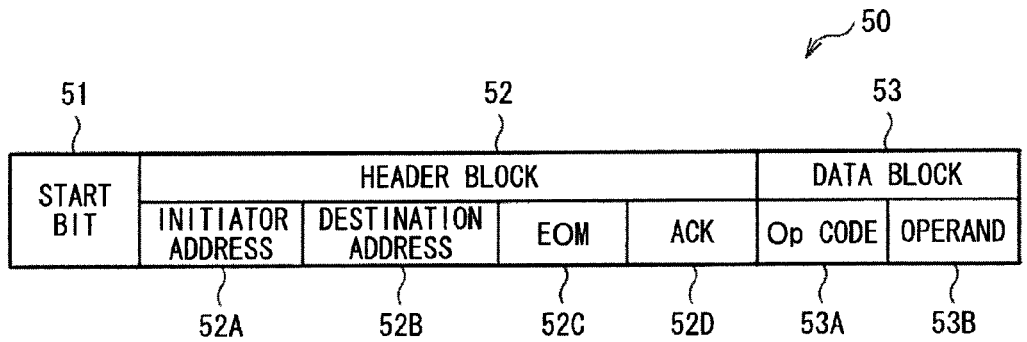
FIG. 2 is a diagram showing a configuration example of a CEC command used in the video system shown in FIG. 1.
FIG. 3 is a diagram showing an example of a logical address table of a video display device of the video system shown in FIG. 1.
FIG. 4 is a diagram showing an example of an address mapping table provided in a video display device of the video system shown in FIG. 1.

FIG. 2 shows an example of a CEC command 50 transmitted/received via the CEC line of the HDMI cable. The CEC command 50 includes a start bit 51, a header block 52, and a data block 53. The start bit 51 indicates start of the command.

The header block 52 includes an initiator address 52A, a destination address 52B, an EOM (End Of Message) bit 52C and an ACK (Acknowledge) bit 52D. The initiator address 52A indicates a logical address of a device that issuing the command, and the destination address 52B indicates a logical address of a device being a destination of the command. The EOM bit 52C indicates the end of a massage. The ACK bit 52D is necessarily set to 1 when a command is transmitted from the initiator, and set to 0 when a destination device receiving the command responds to the message.

The data block 53 includes an Op code 53A and an operand 53B. The Op code 53A shows contents of the CEC command 50, and may specify a common command beforehand defined by the HDMI-CEC standard, for example, a command showing an instruction or a request to the other device, or a command notifying a state of a device itself. Moreover, an original command unique to a manufacturer may be specified by combining the Op code 53A and the operand 53B. In the embodiment, for example, a menu display command, a menu operation notification command, a menu-operation-prohibited command, and a menu release command are prepared as the original commands. The menu display command is a command for the video output device to request display of a menu screen of the video output device itself to the video display device. The menu operation notification command is a command for a video output device in a menu-operation-prohibited mode to notify the video display device of a fact that a user has performed menu start operation to the video output device itself. The menu-operation-prohibited command is a command for the video display device to prohibit the video output device from performing menu operation. The menu release command is a command for the video display device to permit the video output device to perform menu operation. The commands are transmitted and received between the video display device and the video output device, thereby menu-operation-exclusive control may be performed between the devices.

FIG. 3 shows a logical address table showing allocation of a device to a logical address in the video system, and the table is stored in the memory 106M of the CPU 106 of the video display device 10. In this example, a television receiver is allocated to a logical address "0", a recording device I is allocated to a logical address "1", and a reproducing device I is allocated to a logical address "4".

FIG. 4 shows an example of an address mapping table showing a correspondence relationship between a physical address and a logical address, and the table is stored in the memory 106M of the CPU 106 of the video display device 10. In an example shown in the figure, a logical address "4" is allocated in correspondence to a physical address "1", and a logical address "1" is allocated in correspondence to a physical address "2". The CPU 106 of the video display device 10 refers the address mapping table and the logical address table of FIG. 3, so that the CPU 106 recognizes a fact that the reproducing device I is connected to the HDMI input terminal T1 corresponding to the physical address "1", and the recording device I is connected to the HDMI input terminal T2 corresponding to the physical address "2". Thus, the video display device 10 may perform device control in cooperation with the video output devices 20X and 20Y.

Figure 5:
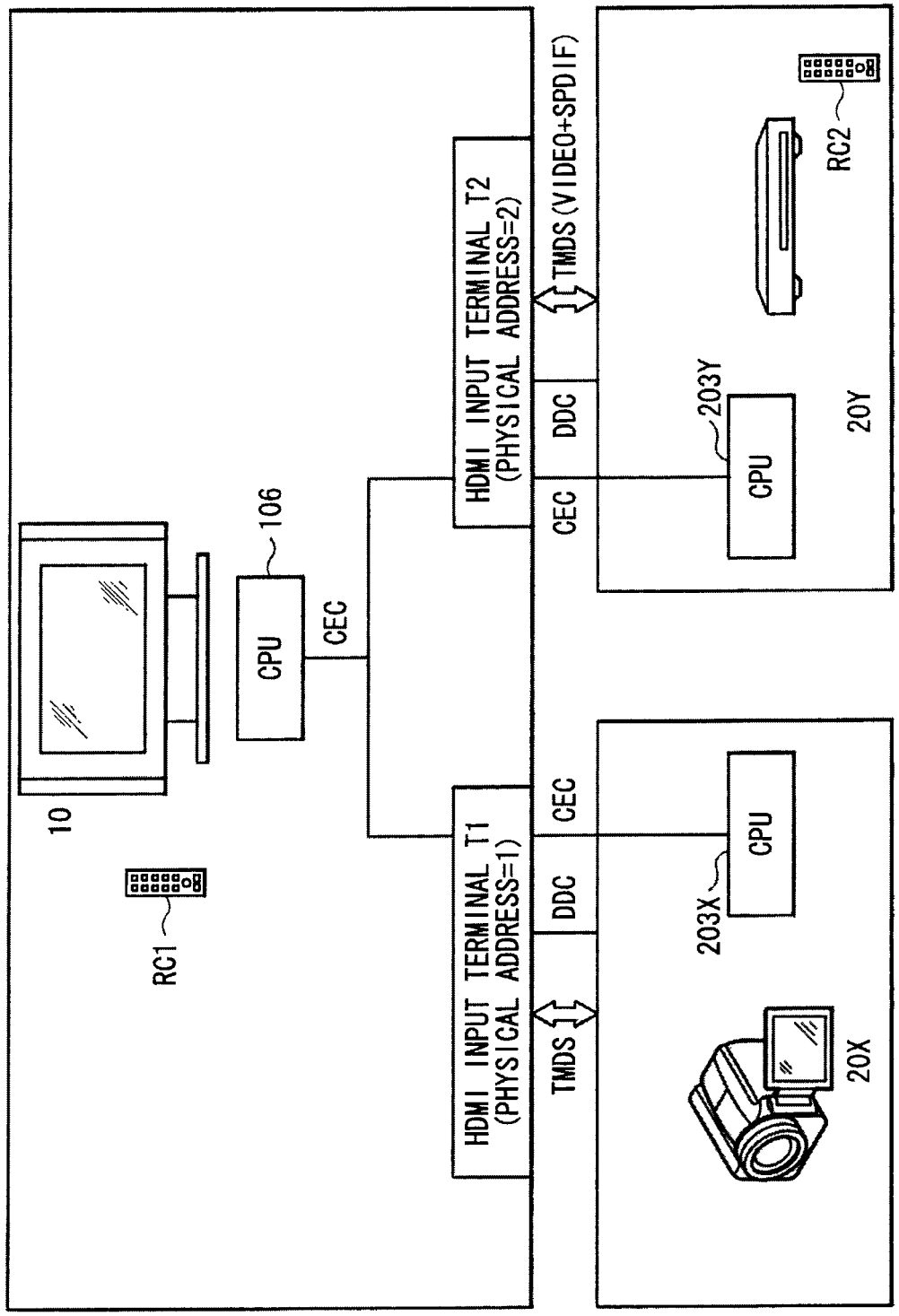
FIG. 5 is a schematic diagram showing the video system shown in FIG. 1 in a simplified manner.

FIG. 5 schematically shows the video system. In the figure, each device is shown with only main portions while other portions are omitted. In the example shown herein, the video display device 10 is a television receiver to which menu operation may be performed by a remote controller RC1. The video output device 20Y is a recorder to which menu operation may be performed by a remote controller RC2. The video output device 20X is a video camera to which menu operation may be performed by an operation key (not shown) provided on a part of the video camera.

Operation

Next, operation of the video system configured as above will be described with reference to FIGS. 6 to 21. FIGS. 6 to 9 express an example of exchange of information between the video display device 10 and the video output devices 20X and 20Y along a time series, and FIGS. 10 to 21 schematically show a state of each device at each time point of the exchange shown in FIGS. 6 to 9 in a simplified manner. In the following description, operation of each device is mainly performed by the CPU 106 or 203.

Figure 6:
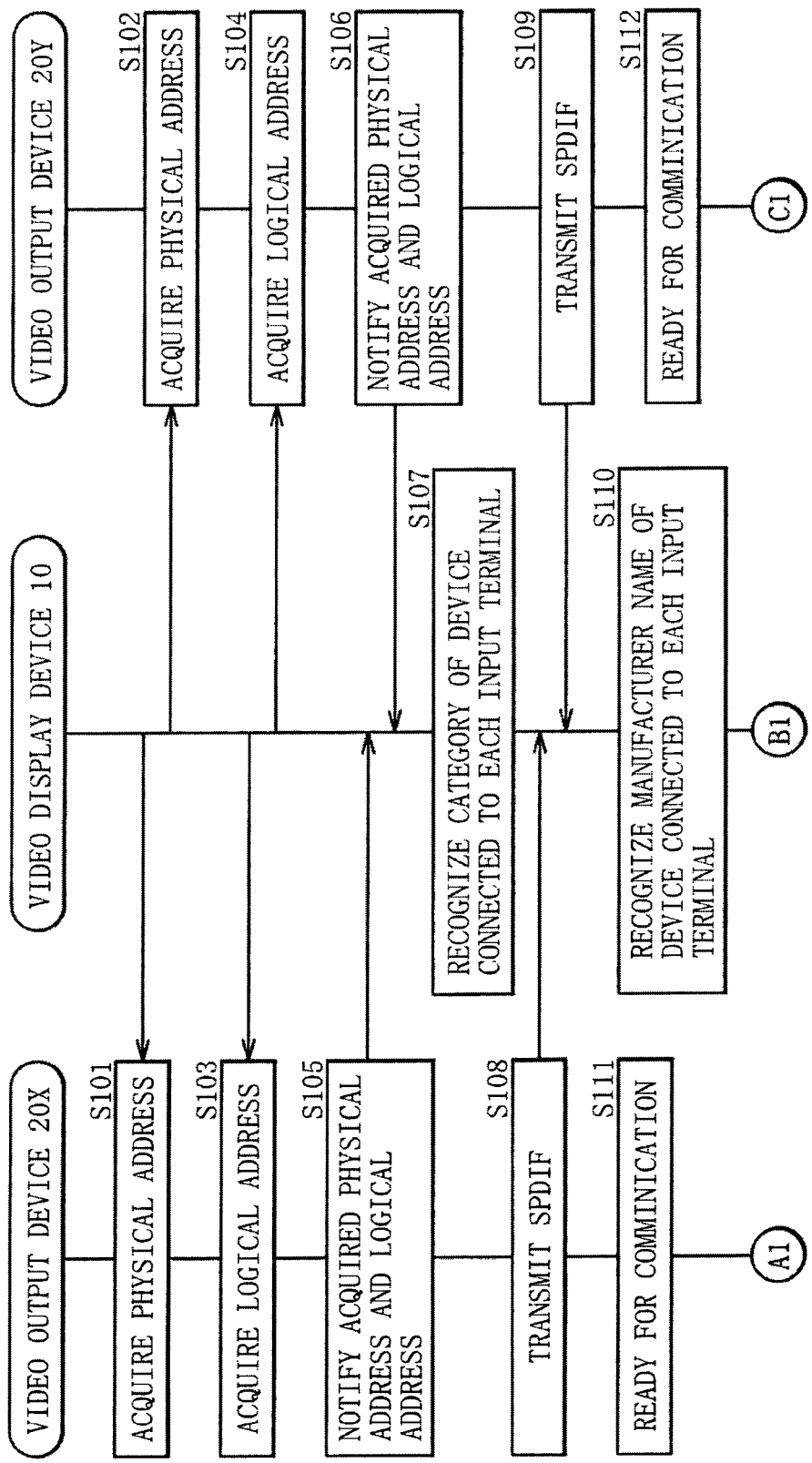
FIG. 6 is a flowchart for illustrating operation of the video system shown in FIG. 1.

In the video system, when each device is up, each of the video output devices 20X and 20Y reads a physical address from the nonvolatile memory M1 or M2 connected to a DDC terminal in one HDMI input terminal of the HDMI input terminals T1 and T2 of the video output device 10, to which the video output device itself is connected, and acquires the physical address via the DDC line L2 (steps S101 and S102 in FIG. 6). The physical address is stored in the memory 203M in the CPU 203 of each of the video output devices 20X and 20Y.

Figure 10:
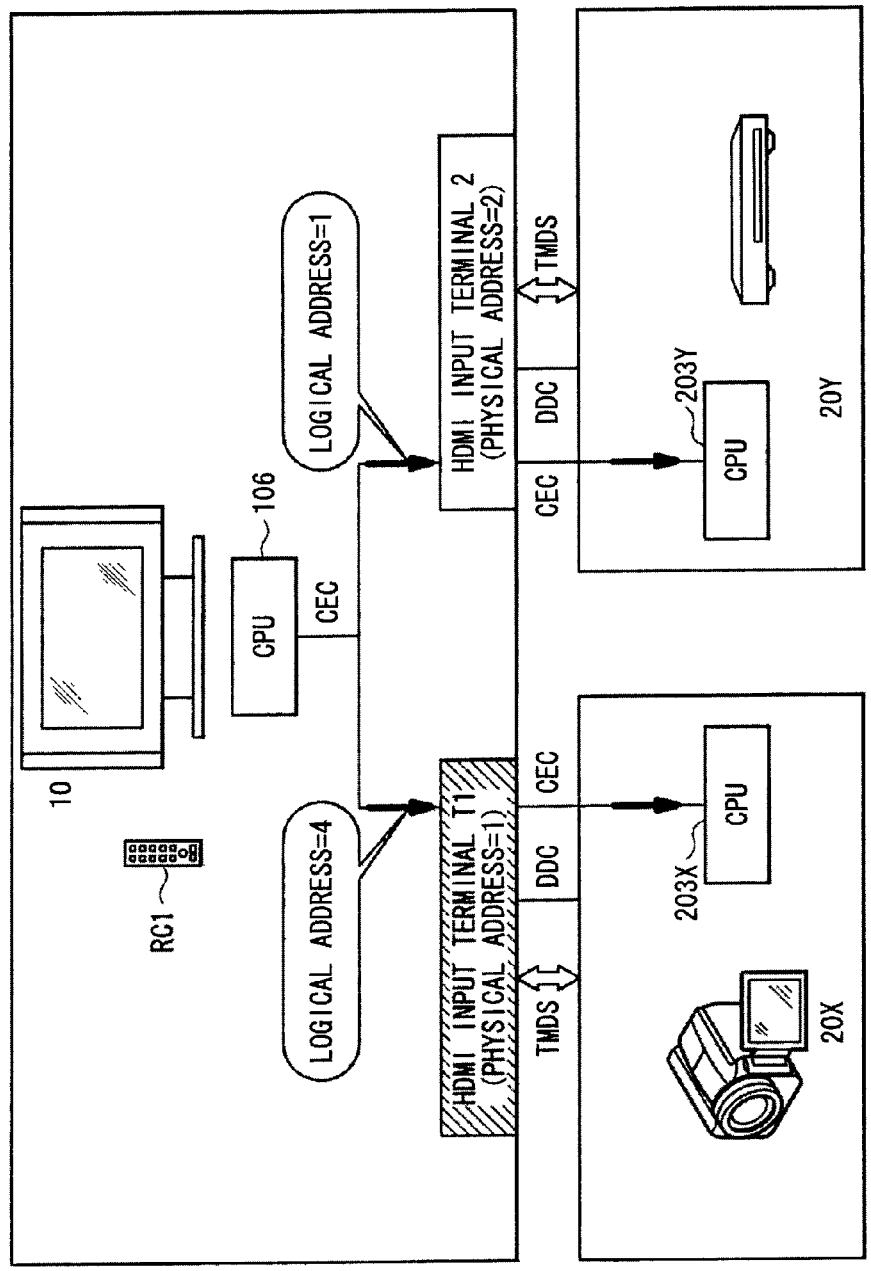
FIG. 10 is a schematic diagram showing an operation state of the video system shown in FIG. 1.

Next, each of the video output devices 20X and 20Y acquires a logical address of the device itself via the CEC line L3 as shown in FIG. 10 (steps S103 and S104). Such operation is performed according to the following procedure. The video output device 20X first notifies the other video output device 20Y of a candidate of the logical address via the video display device 10, and if the candidate address does not overlap with another address, the video output device 20X acquires the candidate address as a logical address of the device itself. If the candidate address overlaps with another address, the video output device 20X notifies the video output device 20Y of another candidate address, and then performs the same processing as above.

Figure 11:
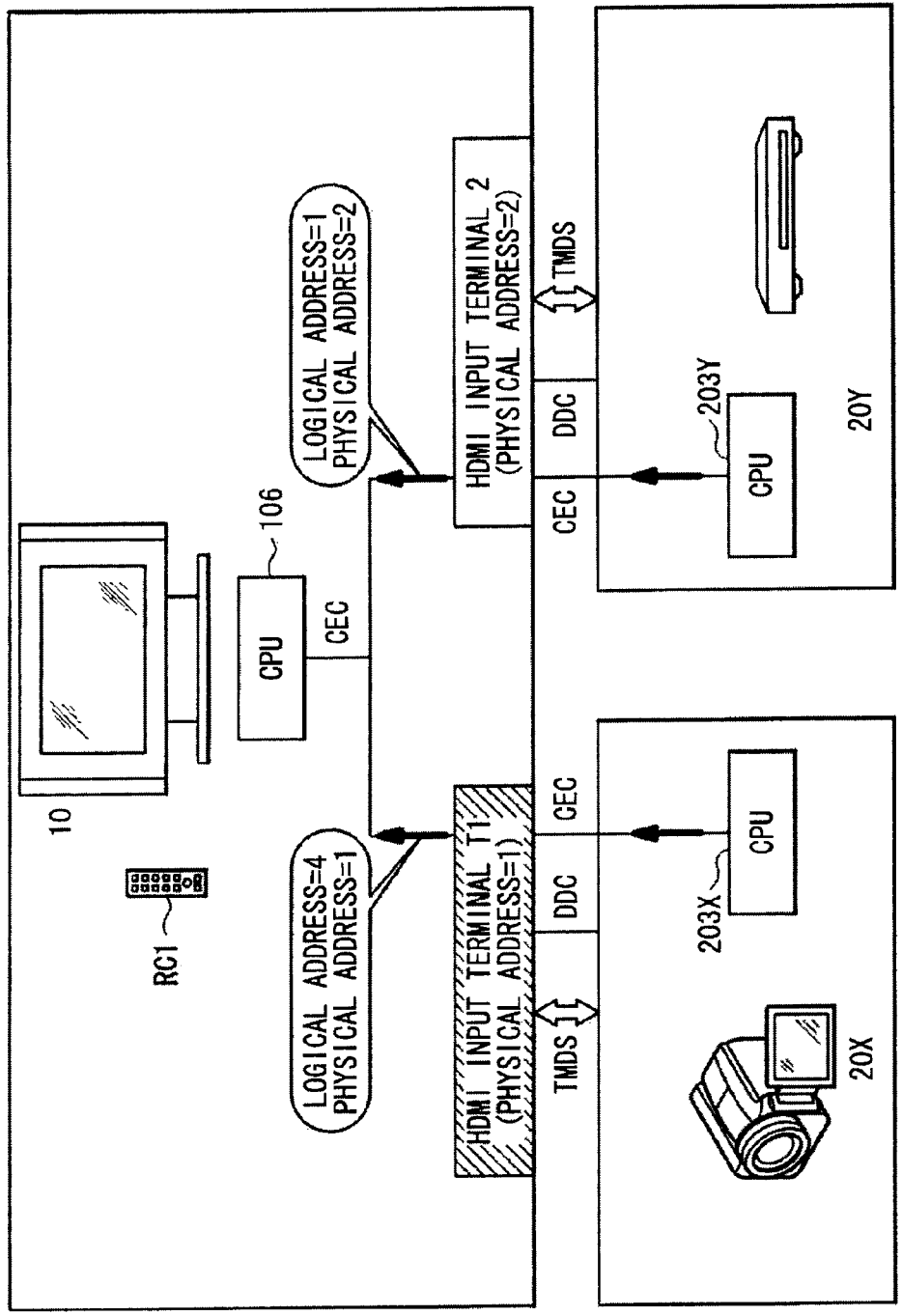
FIG. 11 is a schematic diagram showing another operation state of the video system shown in FIG. 1.

Next, each of the video output devices 20X and 20Y notifies the video display device 10 of the acquired logical address and physical address via the CEC line L3 as shown in FIG. 11 (steps S105 and S106). When the video display device 10 receives such notification, the video display device 10 may know what category of device is connected to each input terminal by referring the tables shown in FIGS. 3 and 4 (step S107). Furthermore, each of the video output devices 20X and 20Y transmits SPDIF to the video display device 10 via the TMDS line L1 (steps S108 and S109). Thus, the video display device 10 may know which manufacturer's product the video output devices 20X and 20Y are (step S110). The logical address, the physical address and the SPDIF sent from the video output device 20X or 20Y are stored in the memory 106M of the CPU 106. Thus, the video output devices 20X and 20Y are ready for communication (steps S111 and S112).

Figure 7:
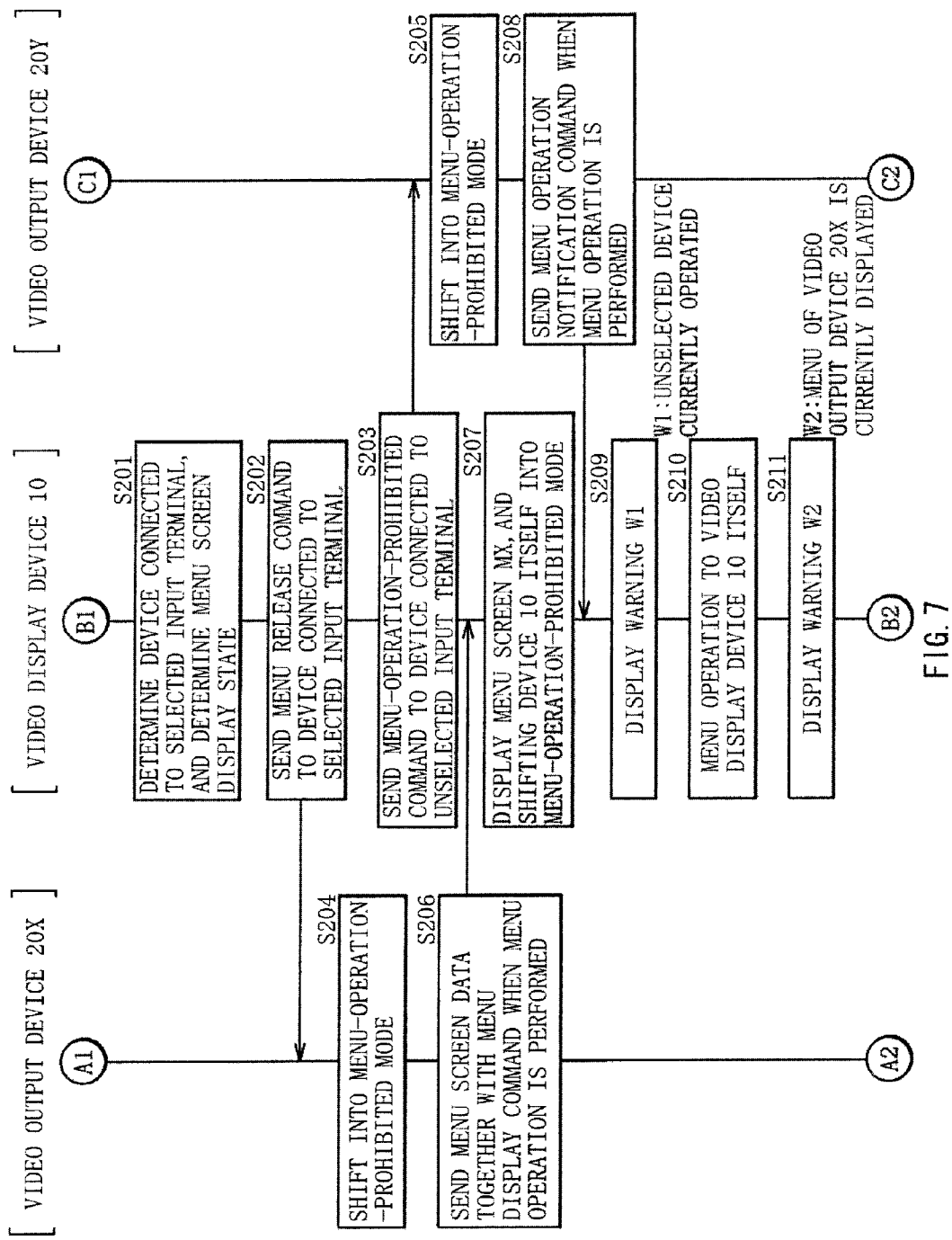
FIG. 7 is a flowchart for illustrating operation continued from FIG. 6.
Figure 8:
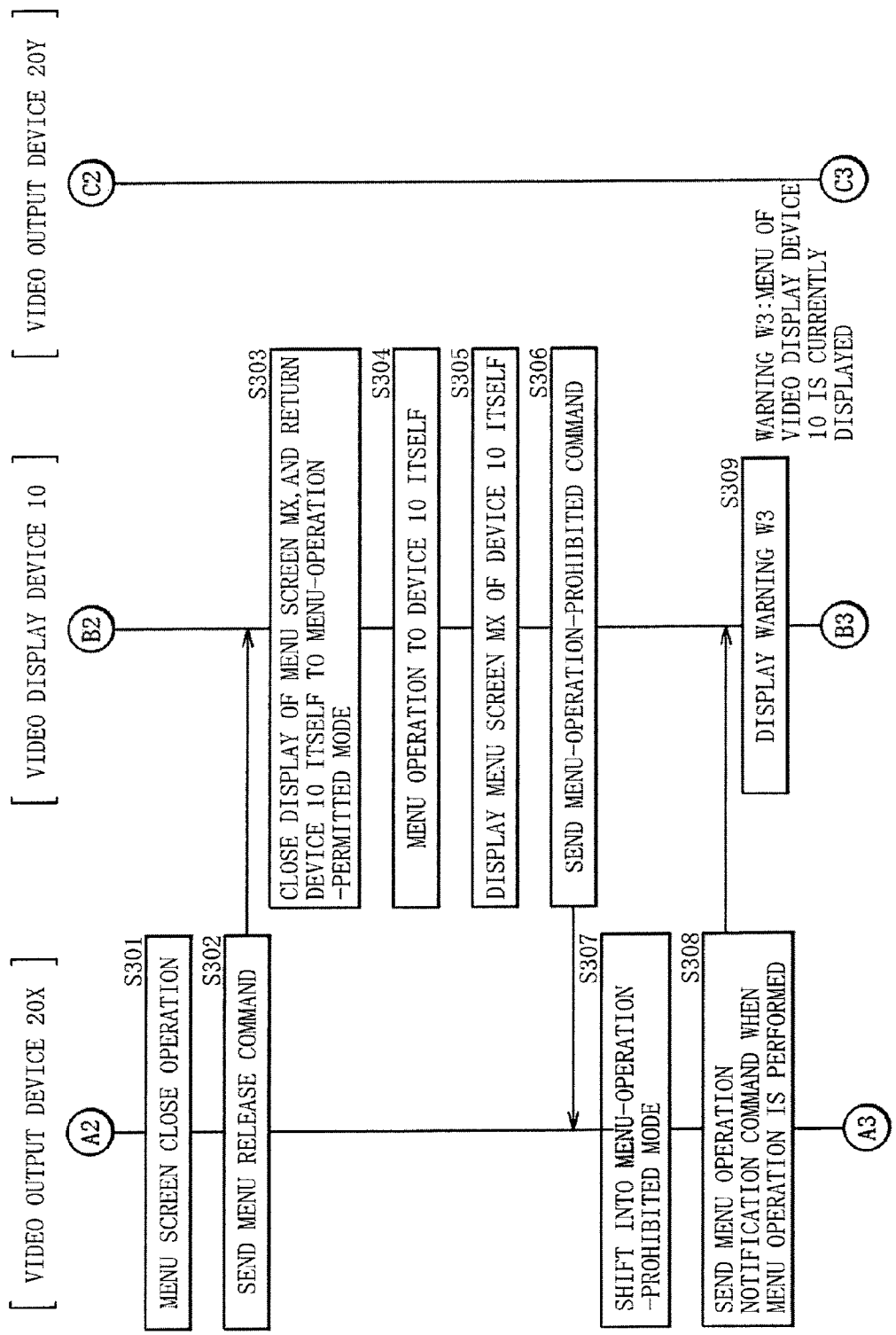
FIG. 8 is a flowchart for illustrating operation continued from FIG. 7.
Figure 9:
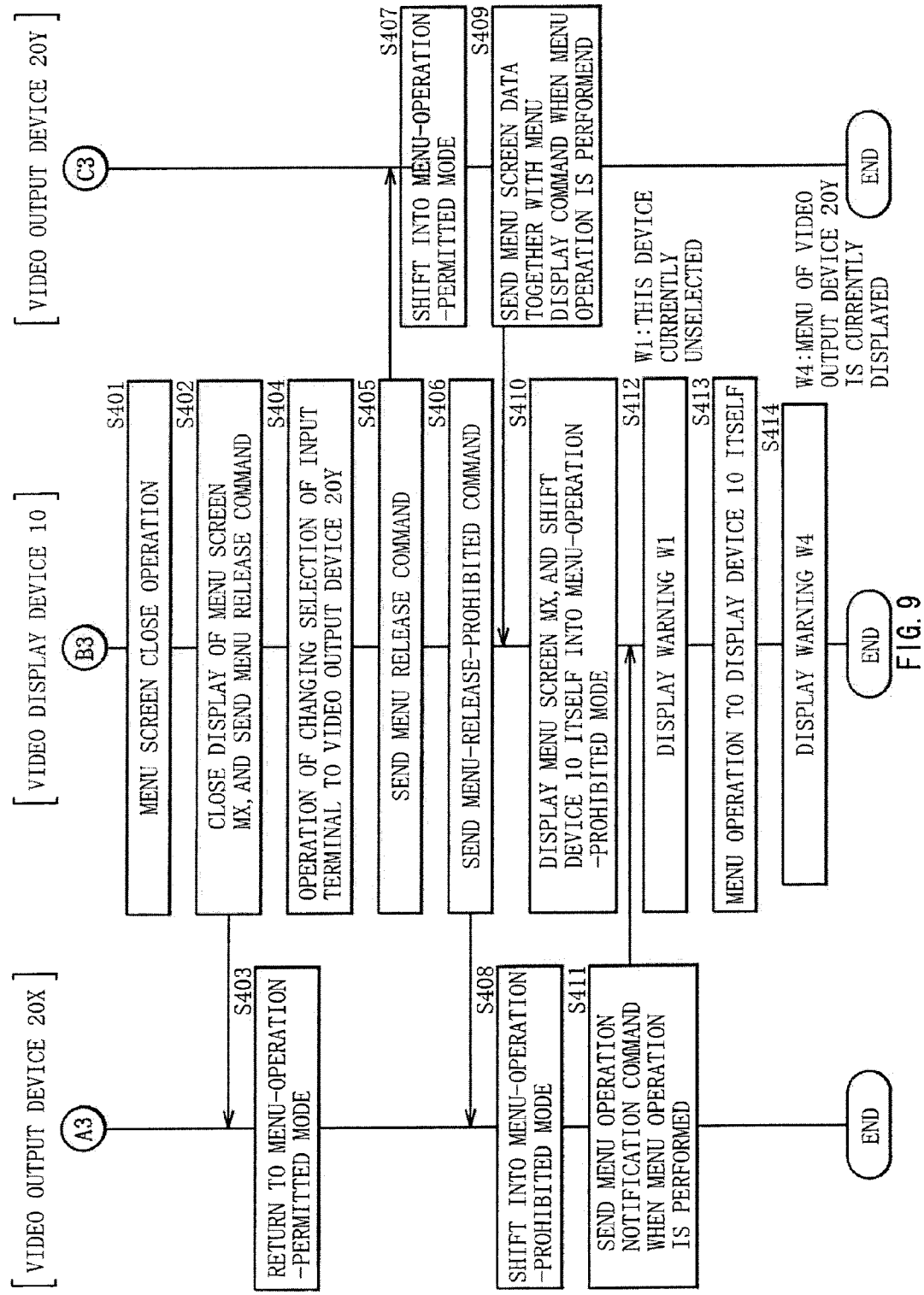
FIG. 9 is a flowchart for illustrating operation continued from FIG. 8.

The video display device 10 continuously monitors an input selection state and a menu screen display state, and determines each state (step S201 in FIG. 7). Specifically, the video display device 10 determines which device input-change is set to (which is a selected input terminal between the HDMI input terminals T1 and T2), and determines whether a menu screen is displayed or not, and when the menu screen is displayed, the device determines which device the menu screen is associated with. Here, description is made assuming that the HDMI input terminal T1 is previously selected, so that a video outputted from the video output device 20X is displayed on the video display device 10, and both menu screens of the video output devices 20A and 20Y are not displayed on the video display device 10. In below-mentioned FIGS. 12 to 21, hatching alternatively added to the HDMI input terminals T1 and T2 expresses an HDMI input terminal on a side selected as an input terminal.

The video display device 10 determines the following two conditions with reference to the memory 106M, and performs after-mentioned operation based on a result of the determination.

Condition 1: "The device is corresponding to this operation."

Condition 2: "The device is connected to a selected input terminal."

The condition 1 is determined from data of SPDIF received from each of the video output devices 20X and 20Y, and the condition 2 is determined from the logical address and the physical address received from each of the video output devices 20X and 20Y.

Figure 12:
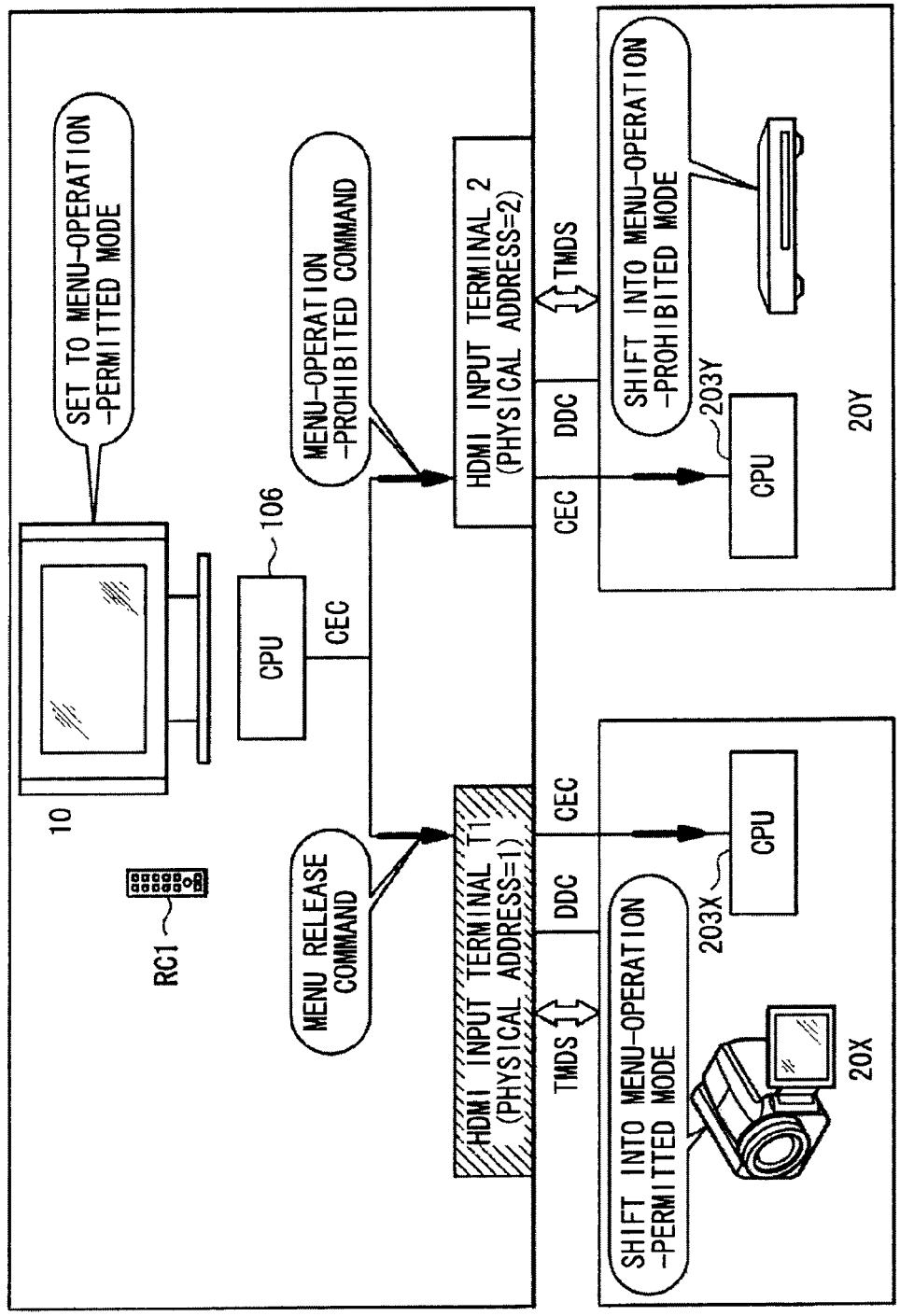
FIG. 12 is a schematic diagram showing still another operation state of the video system shown in FIG. 1.

As a result of the determination, as shown in FIG. 12, the video display device 10 sends a menu release command to the video output device 20X connected to the selected HDMI input terminal T1 (step S202), and sends a menu-operation-prohibited command to the video output device 20Y connected to the unselected HDMI input terminal T2 (step S203). In this case, the menu release command corresponds to a CEC command 50 (FIG. 2) in which the initiator 52A is the video display device 10 (logical address="0"), the destination 52B is the video output device 20X (logical address="4"), the Op code 53A is "vender command", and the operand 53B is "menu permit". In contrast, the menu-operation-prohibited command corresponds to a CEC command 50 (FIG. 2) in which the initiator 52A is the video display device 10 (logical address="0"), the destination 52B is the video output device 20Y (logical address="1"), the Op code 53A is "vender command", and the operand 53B is "menu prohibit".

As shown in FIG. 12, the video output device 20X receiving the menu release command shifts into a menu-operation-permitted mode (step S204), in contrast, the video output device 20Y receiving the menu-operation-prohibited command shifts into a menu-operation-prohibited mode (step S205). Furthermore, the video display device 10 sets the device 10 itself to the menu-operation-permitted mode based on determination that no menu screen is displayed. Setting to the menu-operation-permitted mode or the menu-operation-prohibited mode is performed through setting of a state flag within each of the memories 106M and 203M of the CPUs 106 and 203 in the devices.

The menu-operation-permitted mode corresponds to a mode where a menu screen of a device is displayed on the video display device 10 in accordance with menu start operation (pressing of a menu button) to the device itself by a user, and various kinds of user operation to the device itself may be accepted through the displayed menu screen. In contrast, the menu-operation-prohibited mode corresponds to a mode where any menu operation is prohibited, and even if a user performs menu start operation to a device, a menu screen of the device itself is not displayed on the video display device 10, and any user operation to the device itself are not accepted.

Figure 13:
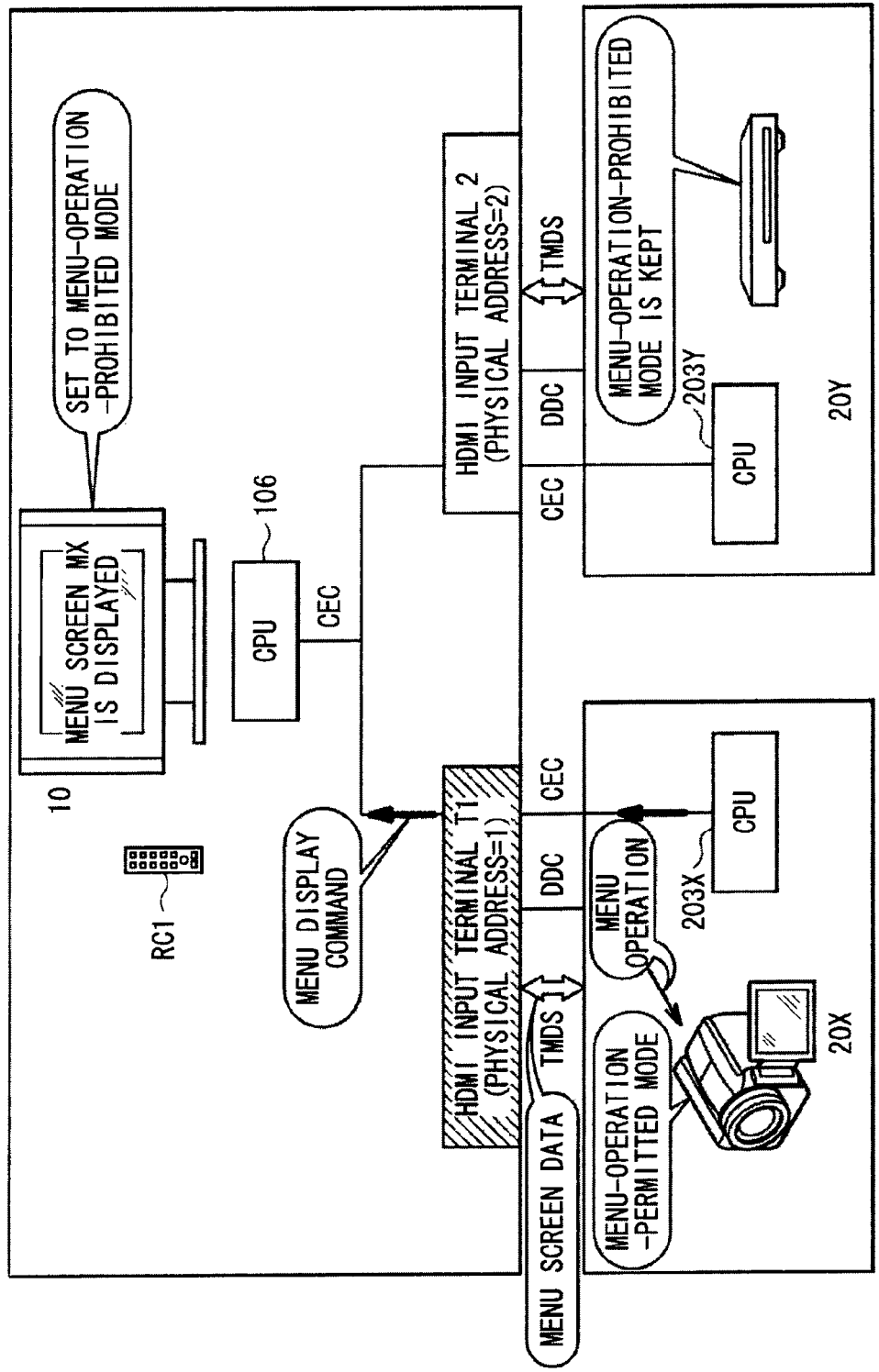
FIG. 13 is a schematic diagram showing still another operation state of the video system shown in FIG. 1.

As shown in FIG. 13, when a user presses a menu button of the video output device 20X in this state, the video output device 20X sends a menu display command to the video display device 10 via the CEC line L3, and sends data of a menu screen MX via the TMDS line L1 (step S206). In this case, the menu display command corresponds to a CEC command 50 (FIG. 2) in which the initiator 52A is the video output device 20X (logical address="4"), the destination 52B is the video display device 10 (logical address="0"), the Op code 53A is "vender command", and the operand 53B is "menu display".

When the video display device 10 receives the menu display command from the video output device 20X, the video display device 10 displays the menu screen MX for operating the video output device 20X, and shifts the device itself into the menu-operation-prohibited mode as shown in FIG. 13 (step S207).

Figure 14:
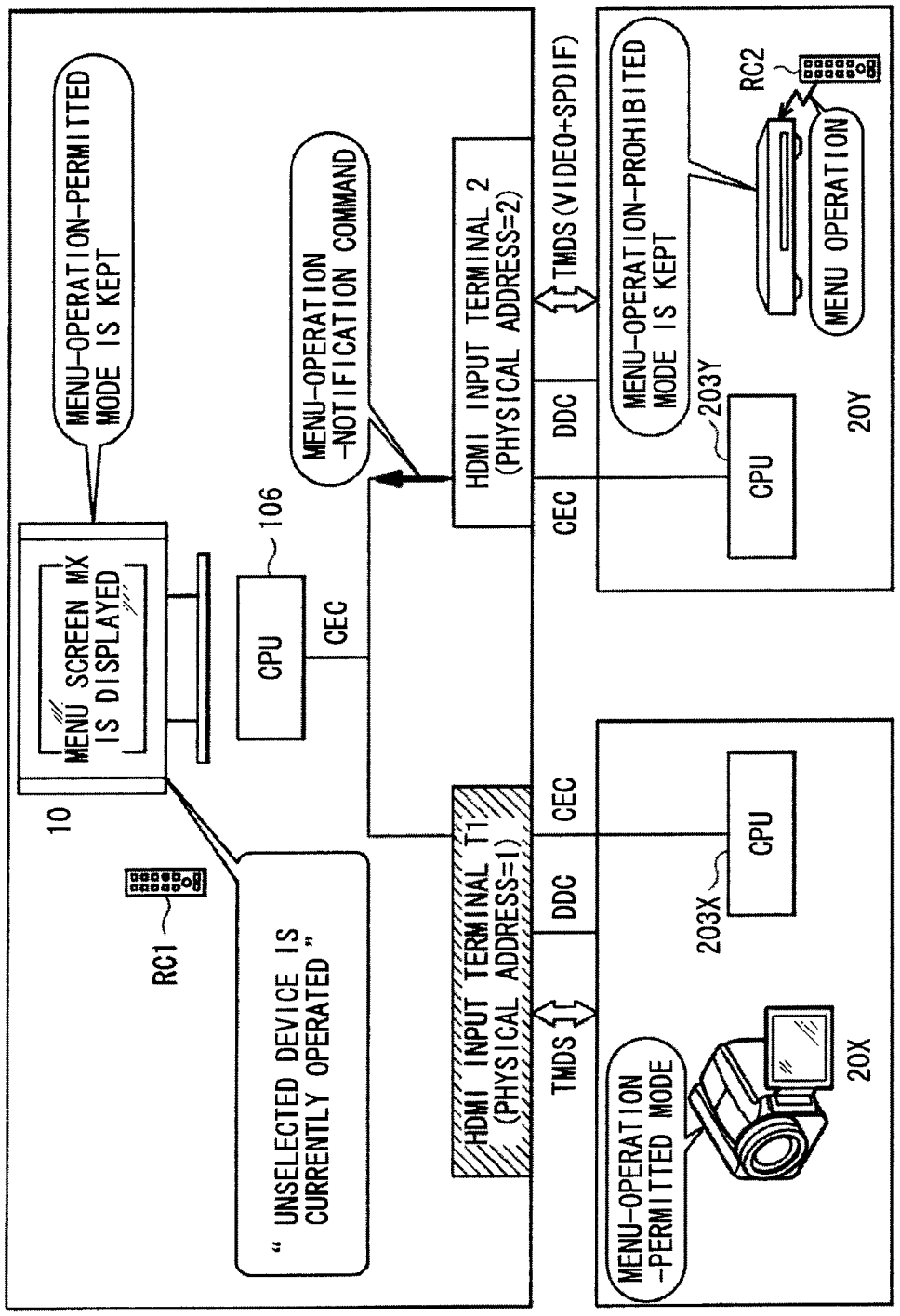
FIG. 14 is a schematic diagram showing still another operation state of the video system shown in FIG. 1.

As shown in FIG. 14, when a user presses a menu button of the video output device 20Y in this state, the video output device 20Y sends a menu operation notification command to the video display device 10 via the CEC line L3 (step S208). In this case, the menu operation notification command corresponds to a CEC command 50 (FIG. 2) in which the initiator 52A is the video output device 20Y (logical address="1"), the destination 52B is the video display device 10 (logical address="0"), the Op code 53A is "vender command", and the operand 53B is "menu operation exists". When the video display device 10 receives the menu operation notification command, the video display device 10 determines that the video output device 20Y is not selected as an input device with reference to the memory 106M, and displays, for example, the following warning message W1.

W1: "An unselected device is currently operated."

Figure 15:
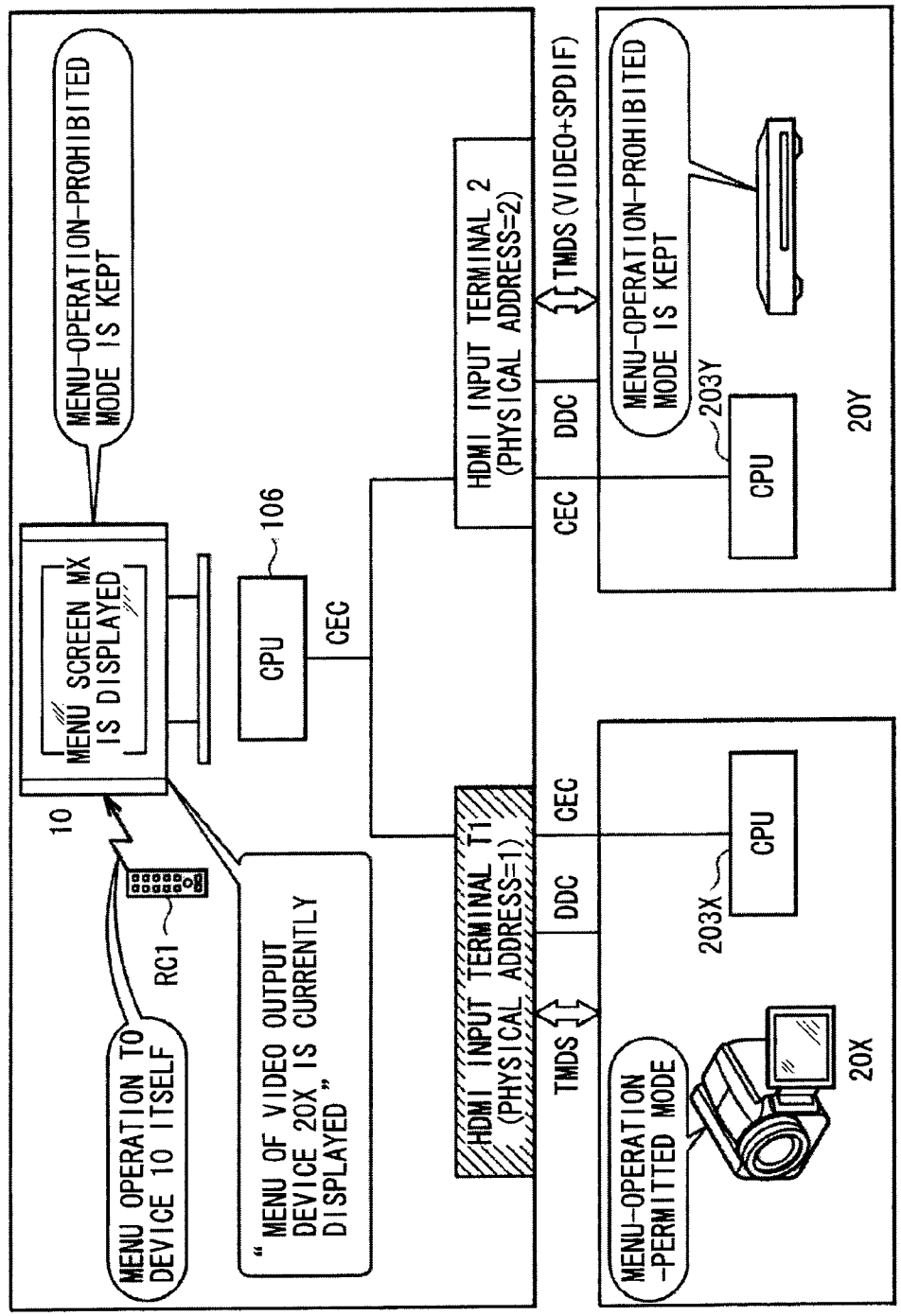
FIG. 15 is a schematic diagram showing still another operation state of the video system shown in FIG. 1.

In addition, as shown in FIG. 15, when a user operates a menu button of the video display device 10, the video display device 10 displays, for example, the following warning message W2.

W2: "A menu of the video output device 20X is currently displayed."

When a user sees the warning message W1 or W2, the user may recognize a fact that currently performed user operation is invalid. Furthermore, even if the user disregards the warning message and continues operation, since devices other than the video output device 20X are in the menu-operation-prohibited mode each, false operation is avoided from being performed to such devices (the video display device 10 and the video output device 20Y) under a condition that the menu screens of the devices are not displayed.

Figure 16:
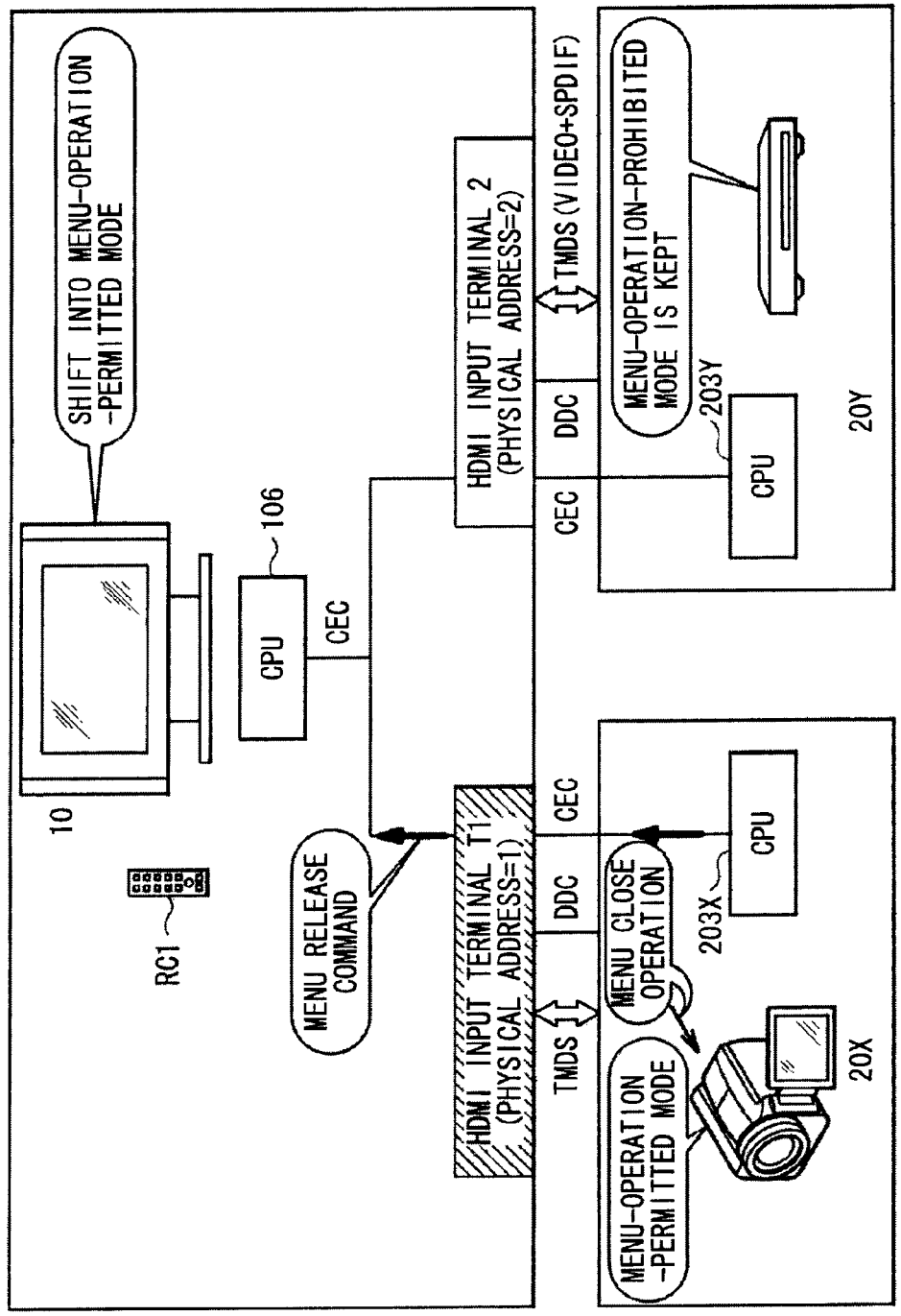
FIG. 16 is a schematic diagram showing still another operation state of the video system shown in FIG. 1.

As shown in FIG. 16, when a user performs menu screen close operation to the video output device 20X in this state (step S301 in FIG. 8), the video output device 20X sends a menu release command to the video display device 10 (step S302). When the video display device 10 receives the menu release command, the video display device 10 closes display of the menu screen MX, and shifts the device itself into a menu-operation-permitted mode (step S303).

Figure 17:
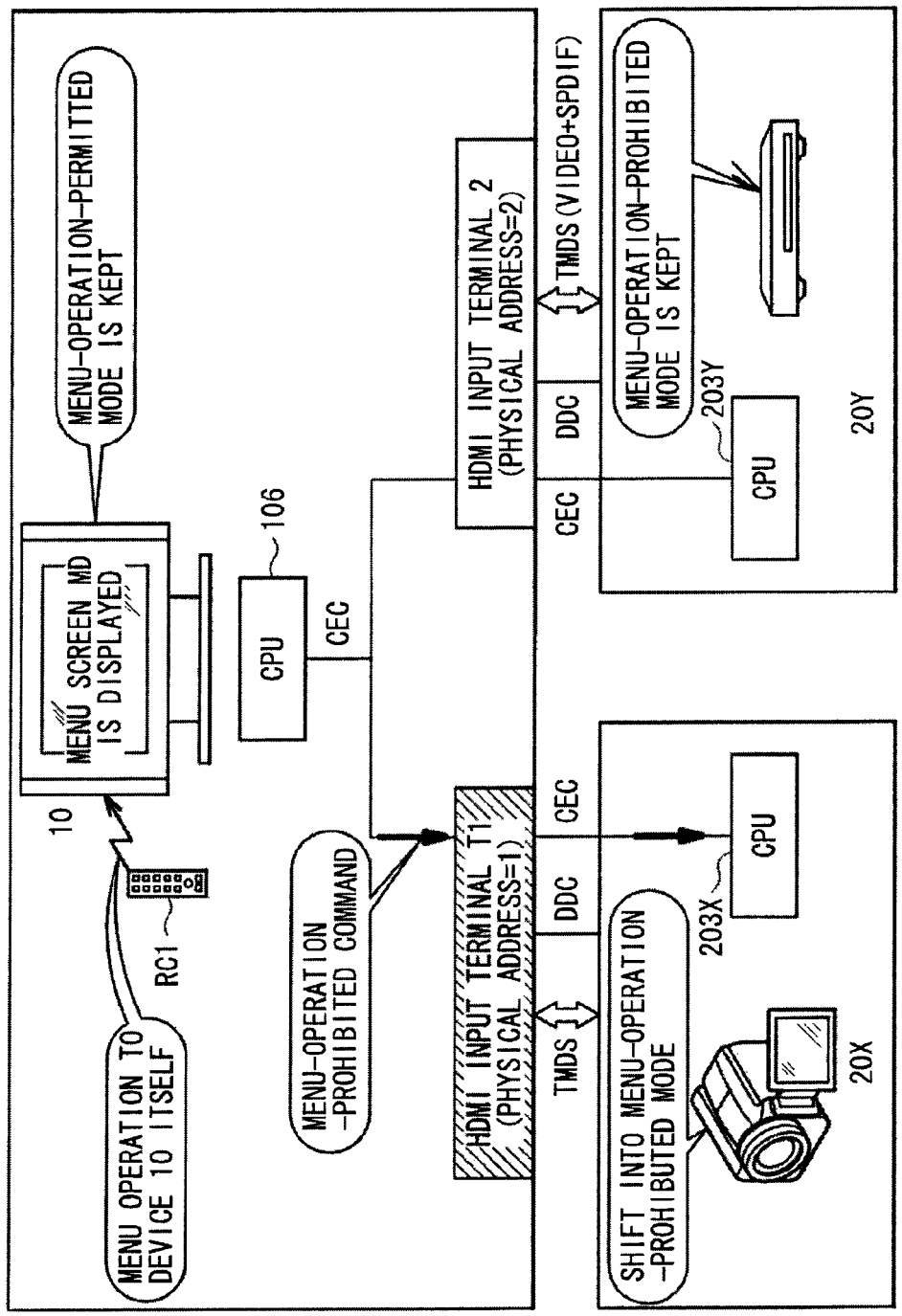
FIG. 17 is a schematic diagram showing still another operation state of the video system shown in FIG. 1.
Figure 18:
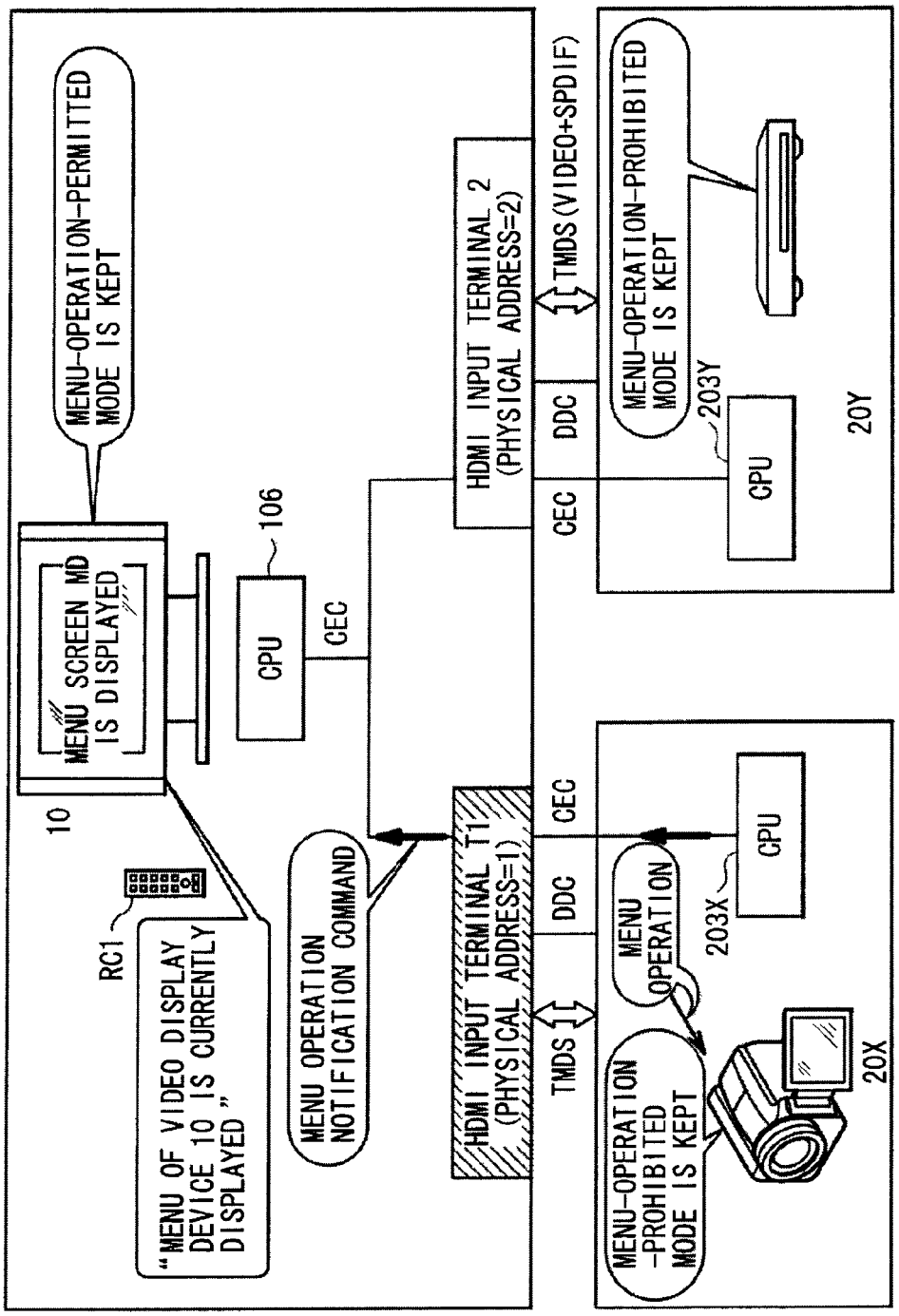
FIG. 18 is a schematic diagram showing still another operation state of the video system shown in FIG. 1.

As shown in FIG. 17, when a user operates a menu button of the video display device 10 in this state (step S304), the video display device 10 displays a menu screen MD of the device itself (step S305), and sends a menu-operation-prohibited command to the video output device 20X (step S306). When the video output device 20X receives the command, the video output device 20X shifts into a menu-operation-prohibited mode (step S307). As shown in FIG. 18, when the user operates a menu button of the video output device 20X in this state, the video output device 20X sends a menu operation notification command to the video display device 10 (step S308). When the video display device 10 receives the command, the video display device 10 displays, for example, the following warning message W3 (step S309).

W3: "A menu of the video display device 10 is currently displayed."

When a user sees the warning message W3, the user may recognize a fact that currently-performed user operation is to a device other than the video display device 10, and thus invalid. Furthermore, even if the user disregards the warning message and continues operation, since the video output device 20X is in the menu-operation-prohibited mode, false operation is avoided from being performed to the video output device 20X under a condition that the menu screen of the device 20X is not displayed.

Figure 19:
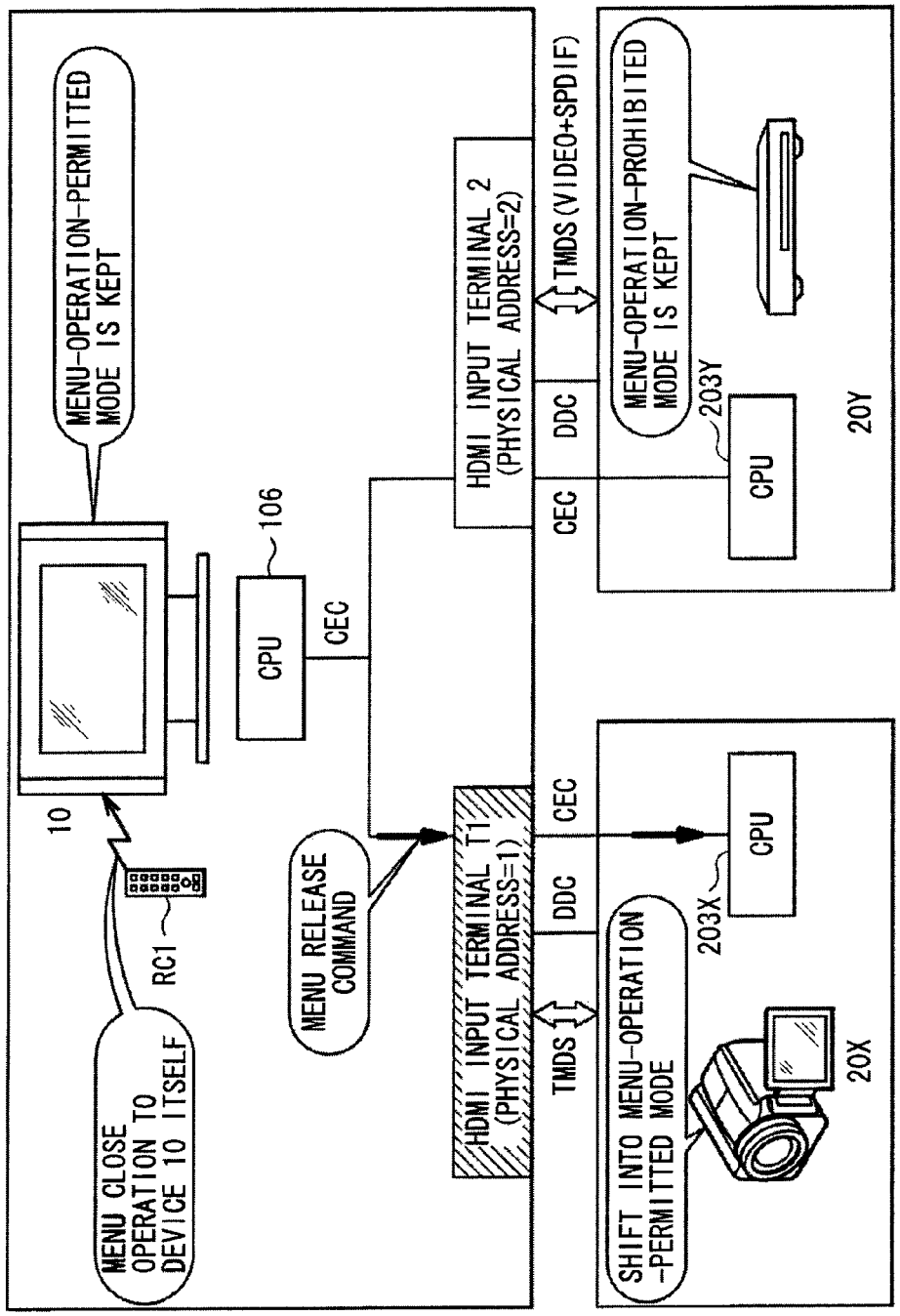
FIG. 19 is a schematic diagram showing still another operation state of the video system shown in FIG. 1.

As shown in FIG. 19, when a user performs menu close operation to the video display device 10 in this state (step S401 in FIG. 9), the video display device 10 closes display of the menu screen MD, and sends a menu release command to the video output device 20X (step S402). When the video output device 20X receives the menu release command, the device 20X returns the device itself to a menu-operation-permitted mode (step S403).

Figure 20:
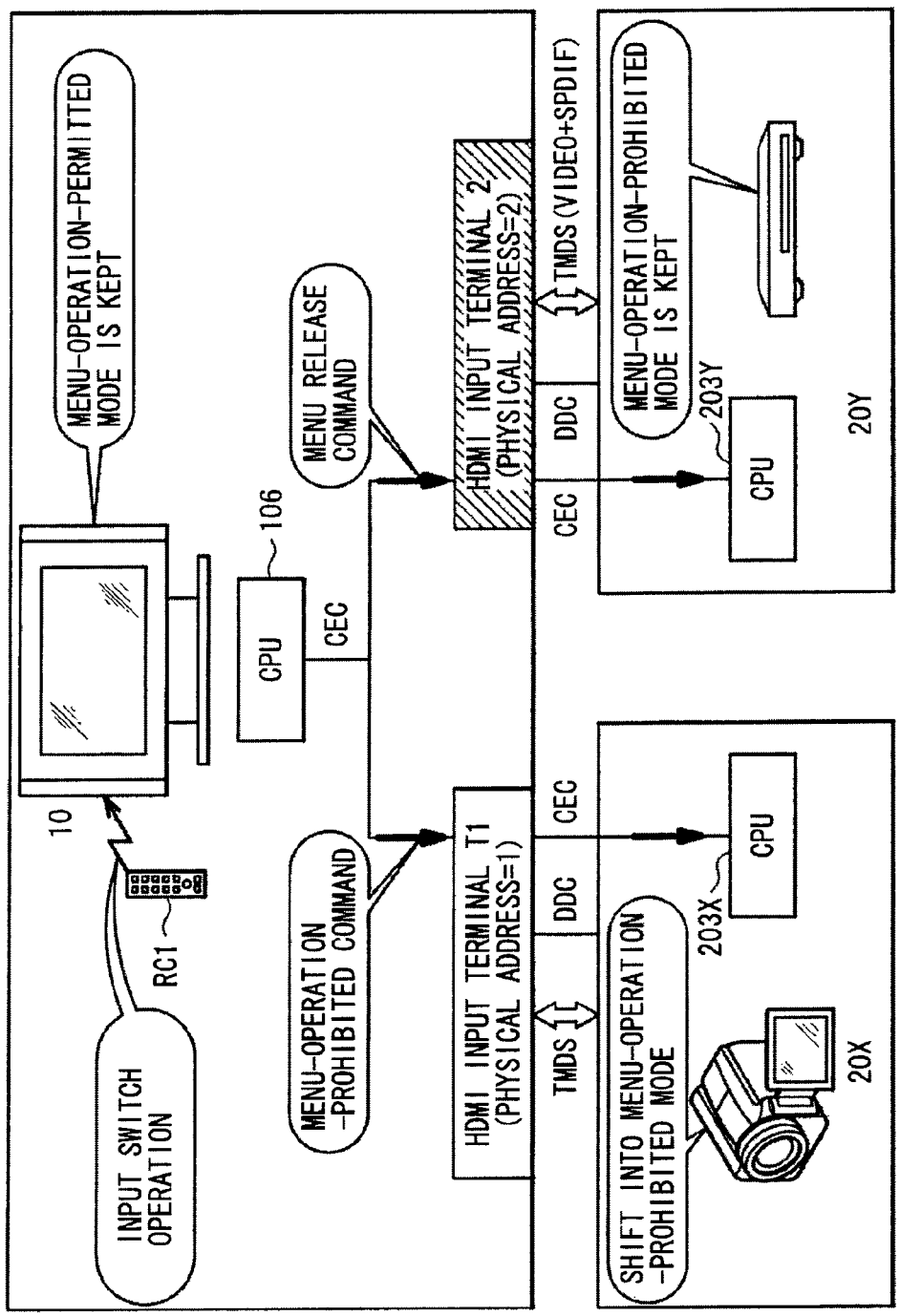
FIG. 20 is a schematic diagram showing still another operation state of the video system shown in FIG. 1.

As shown in FIG. 20, when a user performs operation of changing selection of an input terminal of the video display device 10 from the video output device 20X to the video output device 20Y in this state (step S404), the video display device 10 sends a menu release command to the video output device 20Y (step S405), and sends a menu-operation-prohibited command to the video output device 20X (step S406). Thus, the video output device 20Y shifts into the menu-operation-permitted mode (step S407), and the video output device 20X shifts into the menu-operation-prohibited mode (step S408). After that, a menu screen of the video output device 20Y may be displayed on the video display device 10 in accordance with user operation.

Figure 21:
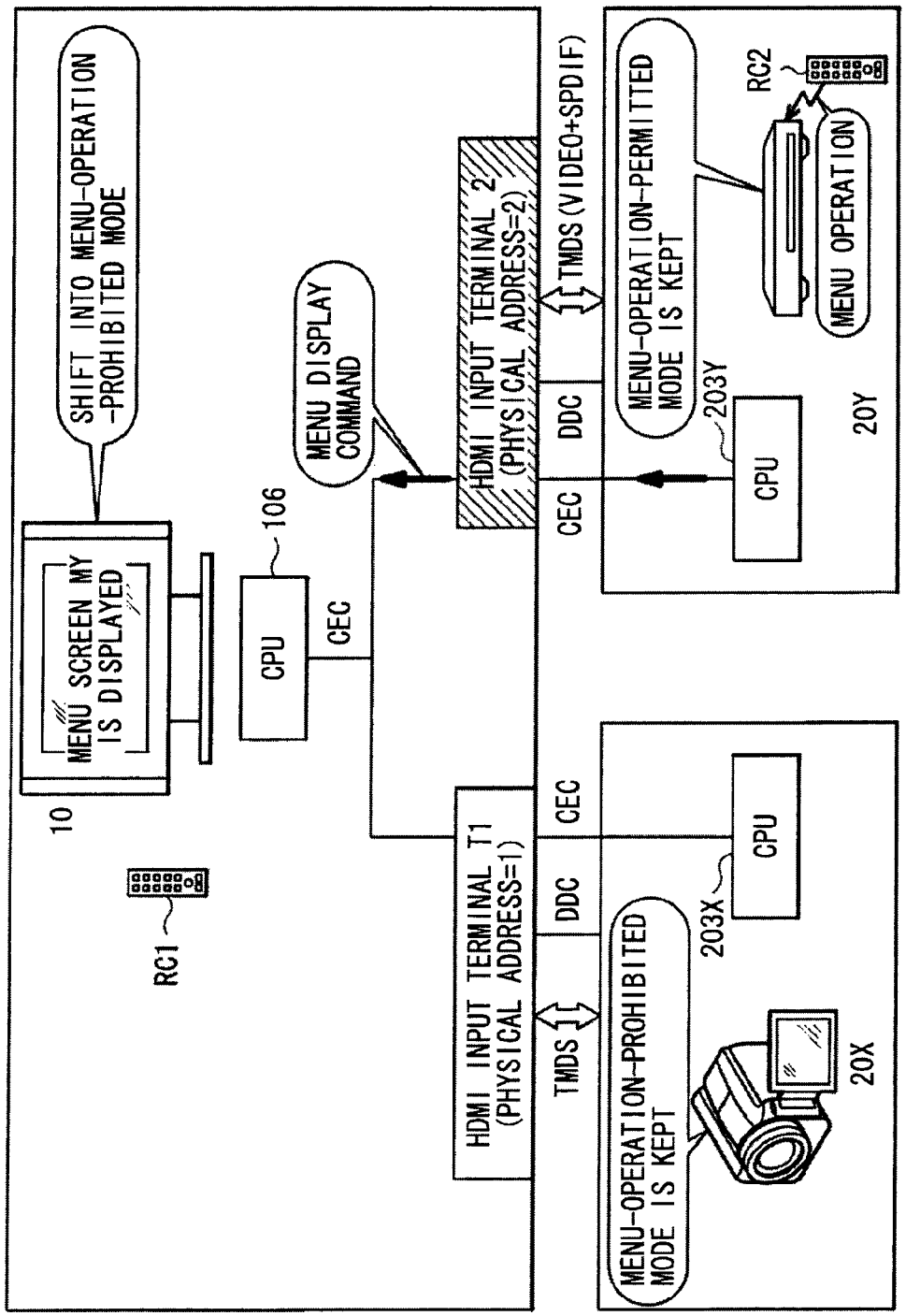
FIG. 21 is a schematic diagram showing still another operation state of the video system shown in FIG. 1.

As shown in FIG. 21, when a user presses a menu button of the video output device 20Y in this state, the video output device 20Y sends a menu display command and data of a menu screen MY to the video display device 10 (step S409). When the video display device 10 receives the menu display command and the data of the menu screen MY from the video output device 20Y, the video display device 10 displays the menu screen MY for operating the video output device 20Y, and shifts the device itself into the menu-operation-prohibited mode (step S410).

When the user operates the menu button of the video output device 20X in this state, the video output device 20X sends a menu operation notification command to the video display device 10 (step S411). When the video display device 10 receives the command, the device displays the warning message W1 as above (step S412).

W1: "An unselected device is currently operated."

When the user operates the menu button of the video display device 10, the video display device 10 displays, for example, the following warning message W4.

W4: "A menu of the video output device 20Y is currently displayed."

When a user sees the warning message W1 or W4, the user may recognize a fact that currently-performed user operation is invalid. Furthermore, even if the user disregards the warning message and continues operation, since devices other than the video output device 20Y are in the menu-operation-prohibited mode each, false operation is avoided from being performed to such devices (the video display device 10 and the video output device 20X) under a condition that the menu screens of the devices are not displayed.

In this way, according to the video system of the embodiment, since menu-operation-exclusive control is performed, where only one device is limitedly set between the video display device 10 and the video output devices 20X and 20Y such that a menu screen of the relevant device may be displayed so that menu operation of the device may be performed, false menu operation by a user may be prevented.

Specifically, for example, when the menu screen of the video display device 10 is displayed, a user is not allowed to perform menu operation of each of the video output devices 20X and 20Y. Therefore, the following disadvantage may be avoided: while the menu screen of each of the video output devices 20X and 20Y is not displayed, a user erroneously recognizes that the menu screen of the video output device 20X or 20Y is displayed, so that the user performs false operation to the video output device 20X or 20Y. Moreover, since a menu screen of an external device (the video output devices 20X and 20Y) and a menu screen of a television receiver (the video display device 10) are prevented from being concurrently displayed, confusion or misunderstanding of a user may be prevented, and consequently false operation may be prevented. In addition, for example, when a menu screen of one of the video output devices is displayed, a user is not allowed to perform menu operation of the video display device 10. Therefore, the following disadvantage may be avoided: operation is erroneously performed to the video display device 10 under a condition that the menu screen of the video display device 10 is not displayed. Furthermore, since menu operation of a device (the video output device 20X or 20Y) connected to an input terminal being unselected (not a video display object) of the video display device 10 is prohibited, false menu operation to such an unselected device (the video output device 20X or 20Y) may be avoided.

Moreover, when a user tries to perform menu operation to a device in the menu-operation-prohibited mode, a warning message having an appropriate content for each case is displayed. Therefore, the user may be alerted, so that misunderstanding or confusion may be promptly eliminated.

While the invention has been described with the embodiment hereinbefore, the invention is not limited to the embodiment, and may be variously modified or altered. For example, while the embodiment has been described with a case where the video display device is a television receiver, the invention is not limited to this, and may be applied to a case where the video display device is an information processing device such as PC (Personal Computer).

Moreover, while the embodiment has been described with a case where the video display device is connected with two video output devices, this is not limitative, and the invention is applicable to even a case where the video display device is connected with at least three video output devices.

Moreover, while the embodiment is designed such that the HDMI cable and the communication protocol according to the HDMI-CEC standard are used as communication tools for the video display device and the video output devices to cooperate with each other, this is not limitative, and various tools according to other standards or methods may be used.

The present application contains subject matter related to that disclosed in Japanese Priority Patent Application JP 2009-049758 filed in the Japan Patent Office on Mar. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A menu-screen-display control method comprising:
   a first determination process of determining in a video display device which video device, of one or more video output devices connected to the video display device, is currently selected as an input device based on a corresponding input terminal;
   a second determination process of determining in the video display device which device, of the video display device and the currently selected video device, is an object of operation through a menu screen displayed on the video display device; and
   a prohibition process of setting all non-object devices into a menu-operation-prohibited mode in respective memories of the non-object devices, the non-object devices being devices other than an operation object device which is determined to be the object of operation through the menu screen under display,
   wherein setting each respective device of the non-object devices into a menu-operation-prohibited mode disables all menu related operations within each respective device of the non-object devices.

2. The menu-screen-display control method according to claim 1,
   wherein when the menu screen under display is determined to be a menu screen directed to the video display device, all the video output devices are set to the menu-operation-prohibited mode.

3. The menu-screen-display control method according to claim 1,
   wherein when the menu screen under display is determined to be a menu screen directed to one of the video output devices, all the remaining video output devices and the video display device are set to the menu-operation-prohibited mode.

4. The menu-screen-display control method according to claim 1,
   wherein when menu operation is performed to the non-object device, warning is displayed on the video display device.

5. The menu-screen-display control method according to claim 1,
   wherein in the case that menu operation is performed to the non-object device, and then display of a menu screen for the operation object device is closed, the non-object device is set to a menu-operation-permitted mode.

6. The menu-screen-display control method according to claim 1,
   wherein when the video display device is connected with a plurality of video output devices, all of the plurality of video output devices not selected as the input device are set to the menu-operation-prohibited mode, and
   when the input device is switched from one video output device to another video output device, such another video output device is set to a menu-operation-permitted mode.

7. The menu-screen-display control method according to claim 1,
   wherein the video display device is connected to each of the video output devices by an HDMI (High Definition Multimedia Interface) cable, and bidirectional communication using a CEO (Consumer Electronics Control) command is performed between the video display device and each of the video output devices, thereby performing the determination process and the prohibition process.

8. A video system comprising:
   a video display device; and
   one or more video output devices connected to the video display device,
   wherein the video display device includes
   a display section,
   a determination section making:
      a first determination of determining in the video display device which video device, of the one or more video output devices connected to the video display device, is currently selected as an input device based on a corresponding input terminal; and
      a second determination of determining which device, of the video display device and the currently selected video device, is an object of operation through a menu screen displayed on the video display device, and
   a command issue section issuing a menu-operation-prohibited command for setting all non-object devices into a menu-operation-prohibited mode in respective memories of the non-object devices, the non-object devices being devices other than an operation object device which is determined to be the object of operation through the menu screen under display, and
   the video output device includes:
   a communication section for communicating with a video display device, and
   a control section setting the video output device itself to a menu-operation-prohibited mode when the control section receives a menu-operation-prohibited command from the video display device via the communication section,
   wherein setting each respective device of the non-object devices into a menu-operation-prohibited mode disables all menu related operations within each respective device of the non-object devices.

9. The menu-screen-display control method according to claim 1, one or more video output devices comprises at least two video output devices.

10. The menu-screen-display control method according to claim 1, further comprising:

when no menu screen is displayed by the video display device, displaying a first menu screen of the video display device responsive to selection on a remote of an operation corresponding to the video display device or displaying a second menu screen of the currently selected video device responsive to selection on the remote of an operation corresponding to the currently selected video device.

* * * * *